United States Patent
Simon

(10) Patent No.: US 6,418,871 B1
(45) Date of Patent: Jul. 16, 2002

(54) CONNECTOR BETWEEN ANCHOR AND CHAIN OF SHIPS, ESPECIALLY SAILING BOATS AND YACHTS

(76) Inventor: Werner Simon, Erwinstrasse 2, 42289 Wuppertal (DE)

( * ) Notice: Subject to any disclaimer, the term of this patent is extended or adjusted under 35 U.S.C. 154(b) by 0 days.

(21) Appl. No.: 09/674,986
(22) PCT Filed: Dec. 22, 1998
(86) PCT No.: PCT/EP98/08398
§ 371 (c)(1), (2), (4) Date: Dec. 18, 2000
(87) PCT Pub. No.: WO00/37307
PCT Pub. Date: Jun. 29, 2000

(51) Int. Cl.⁷ .............................................. B63B 21/24
(52) U.S. Cl. ............................ 114/293; 114/294; 59/95
(58) Field of Search ................................ 114/294, 293, 114/230.2, 253, 230.3, 230.21–230.09; 59/84, 93, 95

(56) References Cited

U.S. PATENT DOCUMENTS

| | | | | |
|---|---|---|---|---|
| 3,908,963 A | * | 9/1975 | Bates et al. | 254/392 |
| 3,977,181 A | * | 8/1976 | Odegard et al. | 59/93 |
| 5,634,246 A | * | 6/1997 | Jermyn, Jr. | 24/601.5 |

FOREIGN PATENT DOCUMENTS

| | | |
|---|---|---|
| DE | 197 26 893 C1 | 8/1998 |
| FR | 567127 | 7/1923 |
| GB | 522044 | 6/1945 |

* cited by examiner

*Primary Examiner*—S. Joseph Morano
*Assistant Examiner*—Ajay Vasudeva
(74) *Attorney, Agent, or Firm*—Friedrich Kueffner

(57) ABSTRACT

The invention relates to a connector (15) which consists of an anchor connection component (16) and a chain connection component (17). Said anchor connection component (16) is provided at its one end with a location fork (21) for the anchor. Said chain connection component (17) is provided at its one end with a fork part (41) for accommodating a chain link. One screw bolt (25, 46) each penetrates the limbs (23, 24) of the location fork and the limbs (44, 45) of the fork part (41). Said screw bolt is fixed with its head in the one limb and with its screw shaft (28, 47) in the other limb and is secured by an attachment screw (48) if required. The anchor connection component (16) and the chain connection component (17) are linked with one another via a ball-and-socket joint (19). One component is provided with a ball (38) and the other component with a socket (34) with an opening (37) leading to the location fork (21). The aim of the invention is to facilitate wet-cleaning the ball location room (22) from impurities. To this end, the socket (34) is provided with a hollow sphere section for holding the ball (38) if a tensile load is applied. Said hollow section faces away from the location fork (21). The ball is provided with a front face (39) which faces the location fork (21) and recedes behind the spherical shape. Said front face together with a cylindrical recess (29) which protrudes from the hollow sphere section and faces the location fork (21) forms a pump chamber.

10 Claims, 2 Drawing Sheets

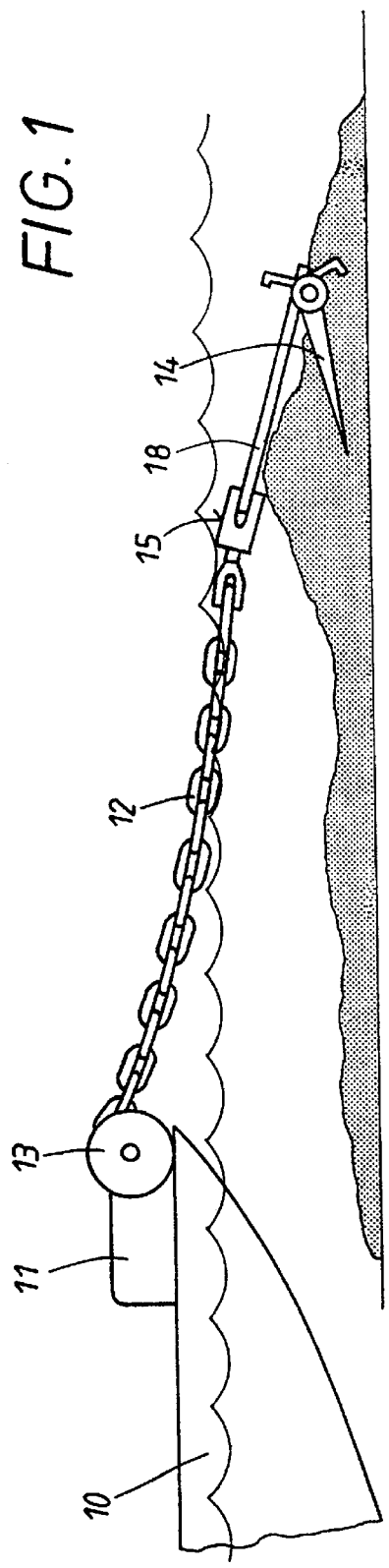
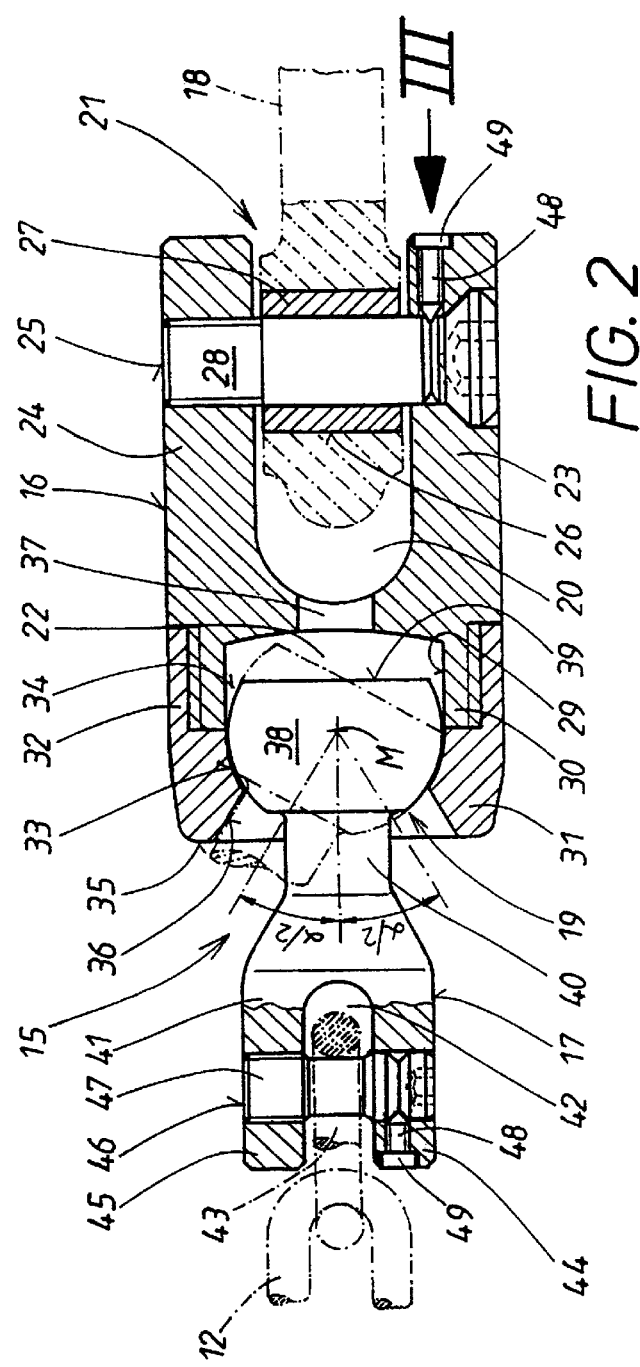
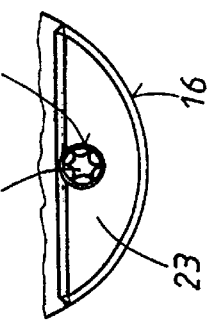

CONNECTOR BETWEEN ANCHOR AND CHAIN OF SHIPS, ESPECIALLY SAILING BOATS AND YACHTS

BACKGROUND OF THE INVENTION

1. Field of the Invention

The invention relates to a connector between anchor and chain of ships, in particular, sailing boats and yachts, whose anchor connection component is provided at its one end with a receiving fork for the anchor and whose chain connection component has at one end a fork portion for receiving a chain member, wherein the legs of the receiving fork and also the legs of the fork portion are penetrated each by a screw bolt which, on the one hand, is secured with its head in one leg and with its threaded shaft in the other leg and can be secured by means of a clamping screw, if needed, wherein the anchor connection component and the chain connection component are connected to one another by a ball-and-socket joint in that one component has a ball head and the other component has a ball socket with an opening that opens into the receiving fork.

2. Description of the Related Art

A connector of the aforementioned kind is known from DE 197 26 893 C1 whose chain connection component comprises the ball head which is secured in the ball socket of the anchor connection component. In addition to the connecting shaft connected to the fork part of the chain connection component, the ball head is in the form of a complete sphere which, aside from the pivoting cutout for the connecting shaft connected to the fork part, is completely enclosed by the ball socket in the chain connection component. At the bottom of the ball socket an opening is located which extends into the slot of the receiving fork of the anchor connection component. This opening is designed to allow contaminants, such as, for example, sand etc. to flow out of the ball socket. Since however the ball head essentially is entirely enclosed by the ball socket, encrustation and soiling may occur so that the flexibility of the ball joint is destroyed, especially in the case of longer residence times of the anchor under water.

SUMMARY OF THE INVENTION

It is an object of the invention to maintain a joint function of a connector which, on the one hand, minimizes the bending loads of the connector as a result of an automatically adjustable angular position of the chain relative to the longitudinal axis of the anchor shaft and which, on the other hand, can be mounted in a simple and inexpensive way, wherein for its use as directed contaminants in the ball-and-socket joint can be safely rinsed out with pumping movements, as a result of rotation, yawing, listing etc. of the hull of the ship. This object is solved according to the invention in that the ball socket has a hollow spherical portion facing away from the receiving fork for securing the ball head when under. tensile load and the ball head comprises an end face facing the receiving fork and recessed relative to the spherical shape, which together with a cylinder chamber, projecting from the hollow spherical portion and oriented toward the receiving fork, form a pumping chamber. Loading as well as load relief movements and moreover also angular movements of the chain result in a pumping movement of the ball head so that, together with the water, contaminants possibly present within the pump chamber are rinsed out so that the angular movability of the connector is ensured.

Even though it is possible to correlate the ball head with the anchor connection component and thus to form the ball socket on the chain connection component, for reasons of sizing considerations it may be advantageous when the ball head is a component of the chain connection component and the ball socket is a component of the anchor connection component. For providing sufficient contact surfaces for the connector when loaded by tension, even when the connection. component on which the ball head is provided, has been moved into its maximum slanted position relative to the aligned position of the longitudinal axes of the connection component, the ball head advantageously has a planar end face positioned on a side opposite the fork part and extending transversely to the longitudinal direction of the chain connection component which is enclosed by an obtuse angle beginning at the center point of the ball, whose value is 180° minus the maximum possible pivot angle of the chain connection. component. In this connection, the depth of the cylinder chamber forming the pump chamber is advantageously slightly greater than the spacing of the edge area of the end face of the ball head, pivoted forwardly the farthest, relative to the ball center point, when pivoting the ball head about half the. value of the pivot angle.

The end face of the ball head, which is normally planar, can however also be embodied. to be concave so that a partially hollow ball head results.

For limiting the pump stroke, a support pin projects advantageously from the end face of the ball head which projects maximally to the imaginary circle supplementing the sphere. This support pin can be designed differently, for example, as a cone with rounded tip. Moreover, it is also possible to design the support pin in the form of a bell-shaped component placed onto the end face of the ball head or to form the support pin as a cylindrical projection whose top is designed as a spherical cap.

In order to prevent accidental or unauthorized detachment of the clamping screw of the position-secured screw bolt, according to a further embodiment of the invention this clamping screw is a head cap screw whose head is designed for actuation by means of a special tool. In this connection, the head of the clamping screw may have a star-shaped polygonal recessed receptacle.

BRIEF DESCRIPTION OF THE DRAWING

The invention is illustrated by means of embodiments in the drawing and will be explained in the following in more detail. It is shown in:

FIG. 1 the anchoring position of a hull of a ship at the bottom of a body of water in a schematic illustration, wherein the anchor chain connected with the hull of the ship is secured at the anchor by the connector;

FIG. 2 the connector formed of two components in a partially broken away, sectional side view illustration on an enlarged scale relative to FIG. 1, wherein the anchor shaft and the anchor chain are illustrated by dash-dotted lines;

FIG. 3 a partial view onto the receiving fork of the anchor connection component in the direction of arrow III of FIG. 2;

DESCRIPTION OF THE PREFERRED EMBODIMENTS

Figure 4:
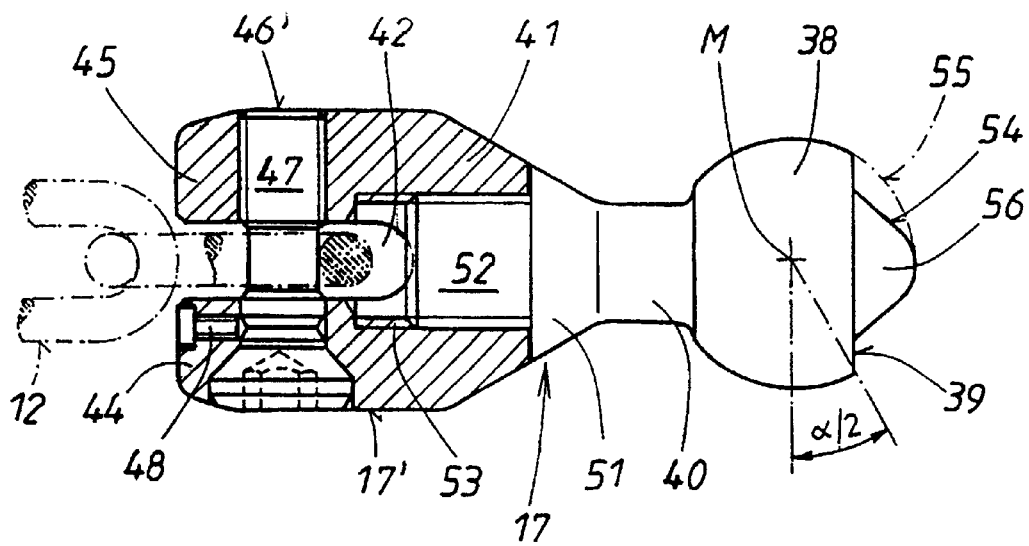
FIG. 4 an embodiment of the two-part chain connection component having the ball head, wherein from the end face of the ball head a support pin in the form of a cone with rounded tip projects.

The ship or boat hull 10 has in a manner known in the art an anchor box 11 from which the anchor chain 12, for example, by means of a hasp 13 with chain sprocket, can be removed and also retracted again. The end of the anchor chain 12 is connected to the anchor 14 by means of a connecter 15. The connector is expediently manufactured of stainless steel and has a size so that tensile forces in the occurring range can be received.

The connector 15 comprises an anchor connection component 16 for the anchor shaft 18 and a chain connection component 17 which are connected to one another by a ball-and-socket joint 19. The end of the anchor connection component 16 facing away from the ball-and-socket joint 19 comprises a slot 20 which is open toward the end face and extends in the longitudinal direction of the anchor connection component 16. The slot forms a receiving fork 21 for the anchor shaft 18. The legs 23 and 24 of the receiving fork 21 are penetrated by a screw bolt 25 whose shaft is surrounded by the anchor shaft 18 inserted into the slot 20. In this connection, between the shaft of the screw bolt 25 and the bore 26 of the anchor shaft 18 a bushing 27 can be positioned. While the leg 23 of the receiving fork 21 receives the head of the screw bolt 25, the threaded shaft 28 of the screw bolt 25 is threaded into a threaded hole in the leg 24 of the receiving fork 21.

A cylindrical recess 29 adjoins the bottom of the slot 20 within the anchor connection portion 16 at a slight spacing; its size will be explained farther below. This recess 29 is concentrically surrounded by a threaded insert 30 of the anchor connection component 16. This threaded portion 30 serves to hold a coupling ring 31 threaded onto it by means of an inner threaded sleeve 32 wherein the inner threaded sleeve 32 is a unitary component of the coupling ring 31. An annular hollow spherical portion 33 adjoins this inner threaded sleeve 32 which together with the recess 29 forms a ball socket 34. The diameter of the cylindrical recess 29 corresponds exactly to the diameter of the hollow ball portion 33. At the end face 35 facing the inner threaded sleeve 32 the coupling ring 31 has an opening formed as a funnel 36 which tapers, starting at the end face 35, toward the spherical ring 33. The chain connection component 17 of the connector 15 comprises a ball head 38 matching the ball socket 34 whose center point M is positioned precisely in the plane of the threaded portion 30 when the connector is loaded by tension and the ball head 38 rests against the hollow spherical portion 33 of the coupling ring 31. The ball head 38 has an end face 39 oriented toward the receiving fork 21 which is recessed relative to the spherical shape wherein this end face is enclosed within an obtuse angle extending from the ball center point M whose value is 180° minus the maximally possible pivot angle α of the chain connection component 17. From the aligned longitudinal position of anchor connection component and chain connecting component, the chain connection component 17 can be pivoted relative to the anchor connection component 16 by half the pivot angle α and then contacts the conical opening 37 of the coupling ring 31. The end face 39 forms together with the recess 29 a pump chamber 22 wherein the depth of the recess 29 is selected such that, when the ball head is pivoted by an angle α/2, the area of the end face 39 projecting farthest into the ball socket 34 does not contact the lower border of the recess.

At the side positioned opposite the end face 39 the ball head has a neck portion 40 with circular cross-section having, in the embodiment according to FIG. 2, a transition into a unitary fork part 41 for receiving a chain member of an anchor chain 12. In this embodiment, the diameter of the fork part 41 is not greater than the smallest diameter at the end of the funnel 36 of the coupling ring 31 with the hollow spherical portion in order to make the assembly possible.

The cylindrical fork portion 41 comprises also a longitudinal slot 42 penetrating centrally from one end face and by which the fork part 41 on the chain connection component 17 is formed. In this longitudinal slot 42 of the fork part 41, a chain member 43 of the anchor chain 12 is received in which the legs 44 and 45 of the fork part 41 are also penetrated by a screw bolt 46 like the chain member 43 of the anchor chain 12. In the chain connection component 17 one of the legs 44 of the fork part 41 also receives the head of the screw bolt 46 while the other leg 45 of the fork part 41 has a threaded bore for threading in the threaded shaft 47 of the screw bolt 46.

In order to counteract possible detachment of the anchor 14 from the anchor chain 12, it is important to secure the screw bolts 25 and 46. As securing members clamping screws 48 are provided which can be formed by the head screws threaded into the respective legs 23 or 44 of the anchor connection component 16 or of the: chain connection component 17 which head screws with their free ends secure the threaded shaft of the respective screw bolt 25, 46. In order to further prevent that these clamping screws can be loosened by an unauthorized person, the head 59 of each clamping screw is designed for actuation with a special. tool. For this purpose, a polygonal recessed receptacle 58 of a star-shape may be provided in the head 49 of the clamping screw 48.

In the case that the cross-section of the fork part 41 does not satisfy the requirements with regard to strength, according to the embodiment illustrated in FIG. 4 the chain connection component 17 can also be designed of a two-part construction. In this connection, the neck portion 40 adjacent to the ball head 38 has an annular collar 51 from which projects a threaded pin 52. The outer diameter of the annular collar 51 is in this connection slightly smaller than the smallest inner diameter of the funnel 36 of the coupling ring 31. On the threaded pin 52 projecting from the annular collar 51, a component portion 17' can then be screwed which, for higher strength requirements, can also have a greater diameter than the chain connection component 17 illustrated in FIG. 2. The embodiment of this component section 17' corresponds to the embodiment of the chain connection component 17. For example, the component section 17' also has a longitudinal slot 42 so that the fork part 41 with its legs 44 and 45 is formed. These legs 44 and 45 are penetrated by a screw bolt 46' which is threaded with its head into the leg 44 and with its threaded shaft 47 into a threaded bore in the leg 45. The longitudinal slot 42 extends into the threaded bore 53 for the threaded pin 52, which bore is provided centrally positioned in the longitudinal axis of the component section 17', so that a securing of the screw connection between the threaded pin 52 and the threaded bore 53 by clamping results upon tightening the screw bolt 46'.

Figure 5:
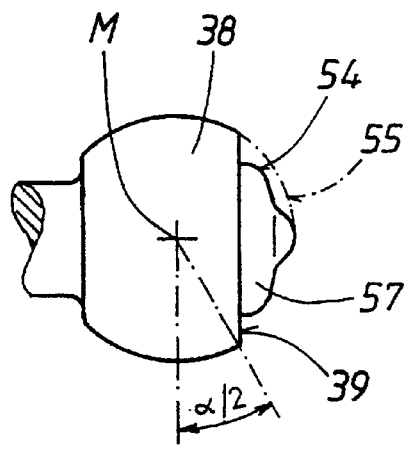
FIG. 5 a further embodiment of the ball head having arranged at its end face a support pin in the form of an attached bell-shaped component.
Figure 6:
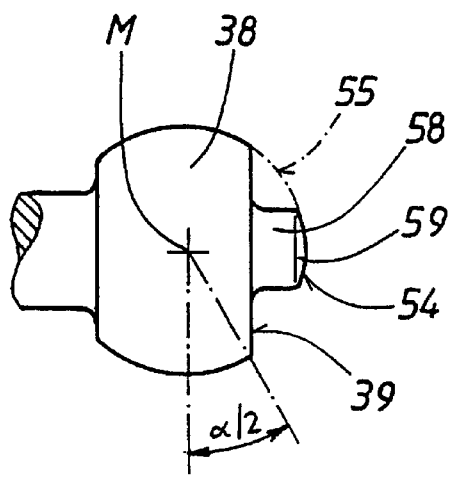
FIG. 6 a further embodiment of a ball head whose support pin projecting from the end face is formed by a cylindrical projection.

As can be seen especially from FIGS. 4 to 6, a support pin 54 may project from the end face 39 of the ball head 38. It projects maximally to the imaginary circle 55 for supplementing the sphere. In the embodiment illustrated in FIG. 4, the support pin 54 is formed as a cone 56 with rounded tip. In the embodiment according to FIG. 5 the support pin 54 is a bell-shaped component 57 which is placed onto the end face 39 of the ball head 38. As already mentioned above, the configuration of the support pin 54 can be varied. For example, it is also possible to form a support pin 54 in the shape of the embodiment illustrated in FIG. 6 in that the support pin 54 is formed by a cylindrical projection 58 whose top is a spherical cap 59.

The above disclosed connection of the anchor connection component 16 with the chain connection component 17 by means of the ball-and-socket joint 19 allows a rotation of these components 16 and 17 relative to one another by 360°. Moreover, an overlapping pivot movement is possible in this connection from the center position into the end positions at an angle α/2, illustrated respectively in FIG. 2 by dash-dotted lines.

As already mentioned above, the illustrated and described embodiments of the invention are only represented as examples which are not to be viewed as limiting. To the contrary, several variants and other designs of the subject matter according to the invention are conceivable. Furthermore, all features which can be taken from the description and the drawings are important to the invention even though they may not the expressly claimed.

List of Reference Numerals:

| | |
|---|---|
| 10 | ship and boat hull |
| 11 | anchor box |
| 12 | anchor chain |
| 13 | hasp |
| 14 | anchor |
| 15 | connector |
| 16 | anchor connection component |
| 17 | chain connection component |
| 17' | component section |
| 18 | anchor shaft |
| 19 | ball-and-socket joint |
| 20 | slot |
| 21 | receiving fork |
| 22 | chamber |
| 23 | leg of 21 |
| 24 | leg of 21 |
| 25 | screw bolt |
| 26 | bore in 18 |

-continued
List of Reference Numerals:

| | |
|---|---|
| 27 | bushing in 26 |
| 28 | threaded shaft |
| 29 | recess/cylinder chamber |
| 30 | threaded portion |
| 31 | coupling ring |
| 32 | inner threaded sleeve |
| 33 | hollow spherical portion |
| 34 | ball socket |
| 35 | end face |
| 36 | funnel |
| 37 | opening |
| 38 | ball head |
| 39 | end face |
| 40 | neck portion |
| 41 | fork part |
| 42 | longitudinal slot |
| 43 | chain member |
| 44 | leg of 41 |
| 45 | leg of 41 |
| 46 | screw bolt |
| 46 | screw bolt |
| 47 | threaded shaft |
| 48 | clamping screw |
| 49 | head of 48 |
| 50 | polygonal receptacle |
| 51 | annular collar |
| 52 | threaded pin |
| 53 | threaded bore |
| 54 | support pin |
| 55 | circle supplementing the sphere |
| 56 | cone |
| 57 | bell-shaped component |
| 58 | cylindrical projection |
| 59 | spherical cap |
| M | ball center point |
| α | pivot angle |

What is claimed is:

1. A connector (15) between anchor (14) and chain (12) of ships, comprising an anchor connection component (16) and a chain connection component (17), wherein the anchor connection component (16) has at one end a receiving fork (21) for the anchor (14) and the chain connection component (17) has at one end a fork part (41) for receiving a chain member (43), and legs (23, 24) of the receiving fork (21) and also legs (44,45) of the fork part (41) are each penetrated by a screw bolt (25, 46), respectively, each screw bolt having its head secured in one of the legs (23,44) of each component and with its threaded shaft (28, 47) secured in the other of the legs (24, 45) of each component and adaptable to be secured by means of a clamping screw (48), wherein the anchor connection component (16) and the chain connection component (17) are connected to one another with their respective other ends such that one component has a ball head (38) and the other component has a ball socket (34) with an opening (37) that opens into the receiving fork (21), wherein the ball socket (34) comprises a hollow spherical portion (33) facing away from the receiving fork (21) for securing the ball head (38) under tensile load and wherein the ball head (38) has an end face (39) facing toward the receiving fork (21) and recessed relative to the spherical shape to form a pump chamber (22) together with a cylindrical recess (29) projecting from the hollow spherical portion (33) and oriented toward the receiving fork (21).

2. The connector according to claim 1, wherein the ball head (38) is a component of the chain connection component (17) and the ball socket (34) is a component of the anchor connection component (16).

3. The connector according to claim 1, wherein the ball head (38) comprises a planar end face (39) positioned at a side opposite the fork part (41) and extending transversely to a longitudinal direction of the chain connection component (17) which end face is enclosed by an obtuse angle originating at a ball center point (M) whose value is 180° minus a maximally possible pivot angle ($\alpha$) of the chain connection component (17).

4. The connector according to claim 1, wherein a depth of the cylinder chamber (29) forming the pump chamber (22) is slightly greater than a spacing of an edge portion of the end face (39) of the ball head (38) pivoted forwardly farthest relative to a ball center point (M), when pivoting the ball head (38) about half a pivot angle ($\alpha/2$).

5. The connector according to claim 1, wherein a support pin (54) projects from the end face (39) of the ball head (38) which projects up to maximally an imaginary circle (55) supplemental to the sphere.

6. The connector according to claim 5, wherein the support pin (54) is formed as a cone (56) with rounded tip.

7. The connector according to claim 5, the support pin (54) is designed in the shape of a bell-shaped component (57) placed onto the end face (39) of the ball head (38).

8. The connector according to claim 5, wherein the support pin (54) is formed by a cylindrical projection (58) whose top is formed as a spherical cap (59).

9. The connector according to claim 1, wherein the clamping screw (48), provided as a securing means of the screw bolts (25, 46, 46'), is a head screw whose head (49) is designed for actuation by means of a special tool.

10. The connector according to claim 9, wherein in the head of the clamping screw (48) a star-shaped polygonal recessed receptacle (50) is provided.

* * * * *